US012721698B2

(12) United States Patent
Wu et al.

(10) Patent No.: US 12,721,698 B2
(45) Date of Patent: Sep. 1, 2026

(54) DENTAL HANDPIECE AND HEAD THEREOF, AND ROOT CANAL PREPARATION MACHINE

(71) Applicant: Guilin Woodpecker Medical Instrument Co., Ltd., Guangxi (CN)

(72) Inventors: Xunxian Wu, Guangxi (CN); Yoshitsugu Terauchi, Guangxi (CN); Kunyou Wu, Guangxi (CN); Chengwang Lu, Guangxi (CN); Yongchao Huang, Guangxi (CN); Fengwen Wei, Guangxi (CN); Jiazhen Xu, Guangxi (CN)

(73) Assignee: Guilin Woodpecker Medical Instrument Co., Ltd., Guangxi (CN)

( * ) Notice: Subject to any disclaimer, the term of this patent is extended or adjusted under 35 U.S.C. 154(b) by 360 days.

(21) Appl. No.: 18/547,542

(22) PCT Filed: Dec. 29, 2021

(86) PCT No.: PCT/CN2021/142651
§ 371 (c)(1),
(2) Date: Aug. 23, 2023

(87) PCT Pub. No.: WO2022/257437
PCT Pub. Date: Dec. 15, 2022

(65) Prior Publication Data

US 2024/0130831 A1 Apr. 25, 2024
US 2024/0225782 A9 Jul. 11, 2024

(30) Foreign Application Priority Data

Jun. 9, 2021 (CN) ........................ 202110642985.8
Jun. 9, 2021 (CN) ........................ 202121289334.7

(51) Int. Cl.
*A61C 5/42* (2017.01)
*A61C 1/14* (2006.01)

(52) U.S. Cl.
CPC ................ *A61C 5/42* (2017.02); *A61C 1/141* (2013.01)

(58) Field of Classification Search
CPC .. A61C 1/148; A61C 1/02; A61C 1/14; A61C 1/10; A61C 1/12; A61C 1/141; A61C 1/06; A61C 1/147; A61C 5/42
See application file for complete search history.

(56) References Cited

U.S. PATENT DOCUMENTS 3,969,823 A * 7/1976 Nakanishi ................ A61C 1/12 433/102
5,145,369 A * 9/1992 Lustig .................... A61C 17/00 433/118

(Continued)

FOREIGN PATENT DOCUMENTS

CN 206324862 7/2017
CN 108478295 9/2018

(Continued)

OTHER PUBLICATIONS

Supplementary European Search Report mailed Jun. 14, 2024, issued in corresponding Application No. EP21944933.7, filed Nov. 22, 2023, 4 pages.

(Continued)

*Primary Examiner* — Heidi M Eide
(74) *Attorney, Agent, or Firm* — CHRISTENSEN O'CONNOR JOHNSON KINDNESS PLLC

(57) ABSTRACT

The present disclosure provides a dental handpiece and a head thereof, and a root canal preparation machine. The head of the dental handpiece includes a head housing; a movement cavity is provided in the head housing; a rotatable movement and a driving gear are provided in the movement (Continued)

cavity; the driving gear is sleeved on one end of the movement, and the movement can move along the axial direction of the driving gear; a reciprocating driving mechanism is further provided in the movement cavity, and the reciprocating driving mechanism is used for driving the movement to perform reciprocating movement along its own axis.

12 Claims, 8 Drawing Sheets

(56) References Cited

U.S. PATENT DOCUMENTS 6,350,125 B1 2/2002 Matsutani
9,833,299 B2 * 12/2017 Shotton .................. A61C 1/148
2010/0330528 A1 * 12/2010 Hof .......................... A61C 5/40 433/105
2015/0320522 A1 * 11/2015 Eder ...................... A61C 1/141 433/173
2015/0374458 A1 12/2015 Yared
2016/0067011 A1 * 3/2016 Rothenwaender ........................... A61B 17/1631 606/1
2018/0049843 A1 * 2/2018 Shotton .................... A61C 1/02
2021/0121267 A1 4/2021 Farrag

FOREIGN PATENT DOCUMENTS

CN 111000638 4/2020
CN 113384366 9/2021
DE 102015114553 3/2017
FR 702260 6/1931
JP 50-15193 2/1975
JP 05-507859 11/1993
JP 2018061710 3/2017

OTHER PUBLICATIONS

Decision to Grant a Patent dated Jul. 5, 2024, issued in corresponding Japanese Application No. 2023-544714, 8 pages.
First Office Action dated May 30, 2024, in corresponding Chinese Application No. 202110642985.8, filed Jun. 9, 2021, 20 pages.
Notice of Reasons for Refusal dated May 24, 2024, issued in corresponding Japanese Application No. 2023-544714, 10 pages.
International Search Report and Written Opinion for PCT/CN2021/142651 (International Filing Date: XXX), mailed Mar. 15, 2022.

* cited by examiner

DENTAL HANDPIECE AND HEAD THEREOF, AND ROOT CANAL PREPARATION MACHINE

CROSS-REFERENCE TO RELATED APPLICATIONS

The present disclosure is a National Stage Application of PCT/CN2021/142651, filed Dec. 29, 2021, which claims the benefit of Chinese Patent Application No. 202110642985.8 filed with the Chinese Patent Office on Jun. 9, 2021, and entitled "Dental Handpiece and Head Thereof, and Endo Motor" and Chinese Patent Application No. 202121289334.7 filed with the Chinese Patent Office on Jun. 9, 2021, and entitled "Dental Handpiece and Head Thereof, and Endo Motor", the entire contents of which are incorporated by reference in the present disclosure.

TECHNICAL FIELD

The present disclosure relates to the technical field of medical appliances, in particular to a dental handpiece and a head thereof, and an endo motor (root canal preparation machine).

BACKGROUND ART

Oral root canal treatment includes measurement for root canal length, root canal enlargement, and root canal filling. During the operation of enlarging the tooth root canal, an endo motor is necessary to be used to enlarge the root canal of the teeth that are damaged or blocked. The root canal is enlarged in such a way that the root canal file is clamped on the contra-angle handpiece of the endo motor and then the contra-angle handpiece is used to unblock and enlarge the root canal.

The inventor found that the machine core of the existing contra-angle handpiece is driven by the drive shaft to achieve rotational movement, and the contra-angle handpiece requires to be lifted repeatedly during the treatment of enlarging the root canal, resulting in low operational efficiency; and since the oral cavity of patient is small, the space for lifting is small and the operation is not convenient especially when treating the posterior teeth.

SUMMARY

The present disclosure provides a head of the dental handpiece, including a head housing, wherein a machine core cavity is provided in the head housing; and a rotatable machine core and a driving gear are provided in the machine core cavity;

- the driving gear is sleeved over one end of the machine core, and the machine core is capable of moving along the axial direction of the driving gear; and
- a reciprocating driving mechanism is further provided in the machine core cavity, and the reciprocating driving mechanism is configured to drive the machine core to perform reciprocating movement along the axial direction of the machine core.

In an optional embodiment, the reciprocating driving mechanism is one of a contactless-driving electromagnet mechanism, a voice coil motor mechanism and a cam mechanism.

In an optional embodiment, the reciprocating driving mechanism is a cam mechanism, including a driving block, a driving protrusion, and an elastic member, wherein

- the driving block is located at an end of the machine core cavity away from the driving gear, and an end surface of the driving block close to the driving gear is provided with an annular driving surface which is coaxial to the machine core, wherein the distance between the driving surface and the driving gear varies gradually along the circumferential direction of the driving block;
- the driving protrusion is provided at the machine core and protruded towards the driving surface; and
- the elastic member is configured to keep the driving protrusion abutting against the driving surface.

In an optional embodiment, the elastic member is sleeved over the machine core and held between the driving gear and the machine core.

In an optional embodiment, the driving surface is an inclined surface.

In an optional embodiment, a first limiting portion is provided at an end of the driving gear directly opposite to the elastic member, so as to limit the movement of the elastic member toward the driving gear.

In an optional typical embodiment, the first limiting portion is a step surface provided at the end portion of the driving gear or a stepped hole formed by recessing inwardly the end surface of the driving gear.

In an optional embodiment, a second limiting portion is provided on the outer side wall of the machine core, so as to limit the movement of the elastic member toward the driving block.

In an optional typical embodiment, the second limiting portion is a protrusion provided on the outside of the machine core, a convex shoulder provided as surrounding the machine core, or a stepped shaft structure made of the machine core.

In the optional embodiment, a cavity for clamping the head of the root canal file is provided inside the machine core, wherein one end of the machine core extends out of the machine core cavity, so as to insert the head of the root canal file into the machine core.

In an optional embodiment, the reciprocating driving mechanism is a cam mechanism, including driving blocks and a driving protrusion, wherein

- two driving blocks are arranged opposite to each other, both of which are sleeved over the machine core; and an annular driving groove is formed between the two driving blocks, wherein the distance between the driving groove and the driving gear varies gradually along the circumferential direction of the driving blocks; and
- the driving protrusion is provided at the machine core, at least partially extends into the driving groove, and is configured to move relatively to the driving groove.

In an optional embodiment, one end of the driving protrusion is inserted into the side wall of the machine core and the other end of the driving protrusion is inserted into the driving groove.

In an optional embodiment, the reciprocating driving mechanism is a cam mechanism, including a machine core sleeve and a driving protrusion, wherein

- the machine core sleeve is sleeved over the machine core and the inner wall of the machine core sleeve is provided with a driving groove which surrounds in the circumferential direction, wherein the distance between the driving groove and the driving gear varies gradually along the circumferential direction of the machine core sleeve; and
- the driving protrusion is provided at the machine core, at least partially extends into the driving groove, and is configured to move relatively to the driving groove. In an optional embodiment, one end of the driving protrusion is inserted into the side wall of the machine core and the other end of the driving protrusion is inserted into the driving groove.

In an optional embodiment, a roller is sleeved over the end of the driving protrusion located in the driving groove; and/or the two opposite side surfaces in the width direction of the driving groove are matched in shape and both are inclined surfaces.

In an optional embodiment, a preload spring is provided in the end of the machine core cavity away from the driving gear, and the preload spring is configured to press the reciprocating driving mechanism against the driving gear.

In an optional embodiment, the driving block is selected from an annular component that surrounds the end portion of the machine core or a component formed by arranging the annular flange on the plate-shaped component.

In an optional typical embodiment, the annular component that surrounds the end portion of the machine core is a bearing.

The present disclosure provides a dental handpiece, including a head of a dental handpiece as described in any one of the preceding embodiments.

The present disclosure provides an endo motor, including a dental handpiece as described in the preceding embodiment.

BRIEF DESCRIPTION OF DRAWINGS

In order to more clearly illustrate the technical solutions of the embodiments of the present disclosure, the following will briefly introduce the drawings used in the embodiments. It should be understood that the following drawings only show some embodiments of the present disclosure, and therefore should not be regarded as a limitation on the scope. Those ordinarily skilled in the art can also obtain other related drawings based on these drawings without inventive effort.

Figure 1:
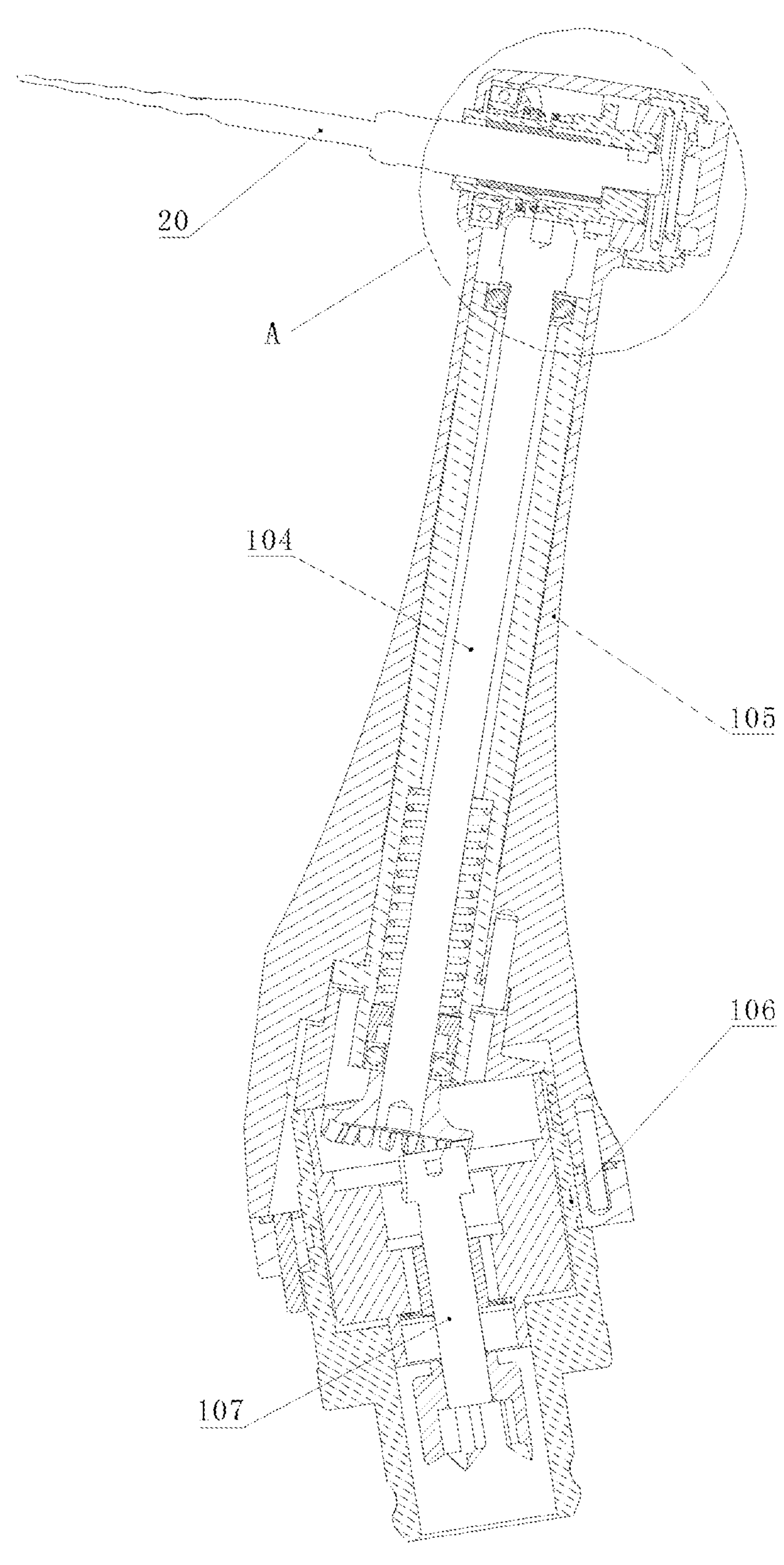
FIG. 1 is a schematic view of the structure of a dental handpiece of an embodiment of the present disclosure.

Reference numerals: 10—head housing; 101—machine core cavity; 102—machine core; 103—driving gear; 104—transmission shaft; 105—first-rod section; 106—second-rod section; 107—connecting shaft; 108—driving block; 1081—driving groove; 1082—driving surface; 109—driving protrusion; 110—elastic member; 111—preload spring; 112—machine core sleeve; 1121—through hole; 20—root canal file; 191—first limiting portion; 192—second limiting portion.

Term Definition

As used herein, the term "dental handpiece", also known as "oral handpiece", refers to a medical device used exclusively in dentistry, such as a product that can be used to grind decayed teeth.

As used herein, the term "driving gear" refers to a mechanical element with gears on the wheel rim that are continuously meshed to transmit motion and power, which is mainly to transmit power.

As used herein, the term "root canal file" refers to a file, such as a disposable file, which is used in medical dentistry, for example, in root canal treatment.

As used herein, the term "preload spring" refers to a spring in the state of compression.

DETAILED DESCRIPTION OF EMBODIMENTS

In dental surgery, root canal enlargement is achieved by clamping the root canal file to the contra-angle handpiece of the endo motor. However, the machine core of the existing contra-angle handpiece is driven by the drive shaft to perform rotational movement, so that the root canal can be opened and enlarged by using the contra-angle handpiece.

It is found by inventor that the contra-angle handpiece is required to be lifted repeatedly during the treatment of enlarging the root canal so that the operation is inefficient; and since the oral cavity of patient is small, the space for lifting is small and the operation is not convenient especially when treating the posterior teeth.

The head of the dental handpiece is provided in the present disclosure, wherein a reciprocating driving mechanism is further provided in the existing machine core cavity, and the reciprocating driving mechanism drives the machine core to perform reciprocating movement along the axial direction of the machine core. Therefore, there is no need to repeatedly lift the contra-angle handpiece during the treatment of enlarging the root canal, resulting in facilitating the operation of enlarging the root canal and improving efficiency of the operation of enlarging the root canal.

In order to make the purposes, technical solutions and advantages of the embodiments of the present disclosure clearer, a clear and complete description for the technical solutions in the embodiments of the present disclosure will be given below in conjunction with drawings in the embodiments of the present disclosure. Apparently, the embodiments described are only some but not all of the embodiments of the present disclosure. The components of the embodiments of the present disclosure generally described and illustrated in the drawings herein can be arranged and designed in a variety of different configurations.

Accordingly, the following detailed description of the embodiments of the present disclosure provided in the drawings is not intended to limit the scope of the claimed disclosure, but merely represents selected embodiments of the present disclosure. Based on the embodiments of the present disclosure, all other embodiments obtained by those ordinarily skilled in the art without creative effort shall fall within the protection scope of the present disclosure.

It should be noted that similar numerals and letters denote similar terms in the following drawings so that once an item is defined in one drawing, it does not need to be further defined and explained in subsequent drawings.

In the description of the present disclosure, it should be noted that the terms "center", "top", "bottom", "left", "right", "vertical", "horizontal", "inside", "outside", etc. indicate an orientation or positional relationship based on the orientation or positional relationship shown in the drawings, or the orientation or positional relationship of the disclosed product generally placed when used, which are intended only to facilitate describing the present disclosure and simplify the description, but not to indicate or imply that the device or element referred to must be in a particular orientation, or be constructed and operate in a particular orientation, and therefore are not to be construed as limiting the present disclosure. In addition, the terms “first”, “second” and “third” are only used to distinguish the descriptive and are not to be construed as indicating or implying relative importance.

In addition, the terms such as “horizontal”, and “vertical” do not mean that elements are required to be absolutely horizontal or overhanging, but can be slightly inclined. For example, “horizontal” only means that its direction is more horizontal than “vertical”, and it does not mean that the structure must be completely horizontal, but can be slightly inclined.

In the description of the present disclosure, it should also be noted that unless otherwise clearly stipulated and limited, the terms “provide”, “amount”, “connect”, and “link” should be understood in a broad sense, for example, it can be a fixed connection, a detachable connection, or an integral connection, it can be a mechanical connection or an electrical connection, and it can be a direct connection, an indirect connection through an intermediary, or an internal communication between two components. Those of ordinary skill in the art can understand the specific meanings of the above terms in the present disclosure according to specific situations.

In some embodiments, the driving protrusion 109 is provided on the machine core 102 and the driving groove 1081 is provided on the head housing 10, wherein the driving protrusion 109 at least partially extends into the driving groove 1081, and is configured to be movable with respect to the driving groove 1081.

In some embodiments, the driving protrusion 109 is provided on the head housing 10 and the driving groove 1081 is provided on the machine core 102, wherein the driving protrusion 109 at least partially extends into the driving groove 1081 and is configured to be movable with respect to the driving groove 1081.

The present disclosure provides a head of a dental handpiece, which is capable of driving the machine core to rotate and driving the machine core to perform reciprocating movement along the axial direction of the machine core. Therefore, there is no need to repeatedly lift the contra-angle handpiece during the treatment of enlarging the root canal, resulting in facilitating the operation of enlarging the root canal and improving efficiency of the operation of enlarging the root canal.

The machine core is provided in the machine core cavity of the head housing and a driving gear is provided at one end of the machine core, wherein the driving gear is configured to be connected to the transmission shaft in a transmission way, so as to transmit the rotating driving torque of the motor to the driving gear through the transmission shaft, so that the machine core is driven to rotate. The machine core is capable of moving along the axial direction of the driving gear. Moreover, a reciprocating driving mechanism is further provided in the machine core cavity, and the reciprocating driving mechanism drives the machine core to perform reciprocating movement along the axial direction of the machine core, so that the machine core performs reciprocating movement while being rotated. When clamping the root canal file, the machine core is able to drive the root canal file to rotate and perform reciprocating movement along the axial direction of the root canal file. Thus, when the head of the dental handpiece of the present disclosure is used for root canal enlargement, by the reciprocating driving mechanism, a root canal file is driven to perform reciprocating movement along the axial direction of the root canal file, so that manual lifting of the handpiece is no longer required, thereby improving the treatment efficiency of root canal enlargement, reducing the requirement on the oral space of the patient, facilitating the operation of the treatment of root canal enlargement, and improving the patient’s experience of treatment.

An embodiment of the present disclosure provides an endo motor, wherein the endo motor comprises a dental handpiece, an operating handle, and a control host, wherein the control host is connected to the operating handle and a motor is built into the operating handle; and when the dental handpiece and the operating handle are connected, the motor is turned on by the start button on the operating handle so that the dental handpiece can work properly for treatment purposes.

Figure 2:
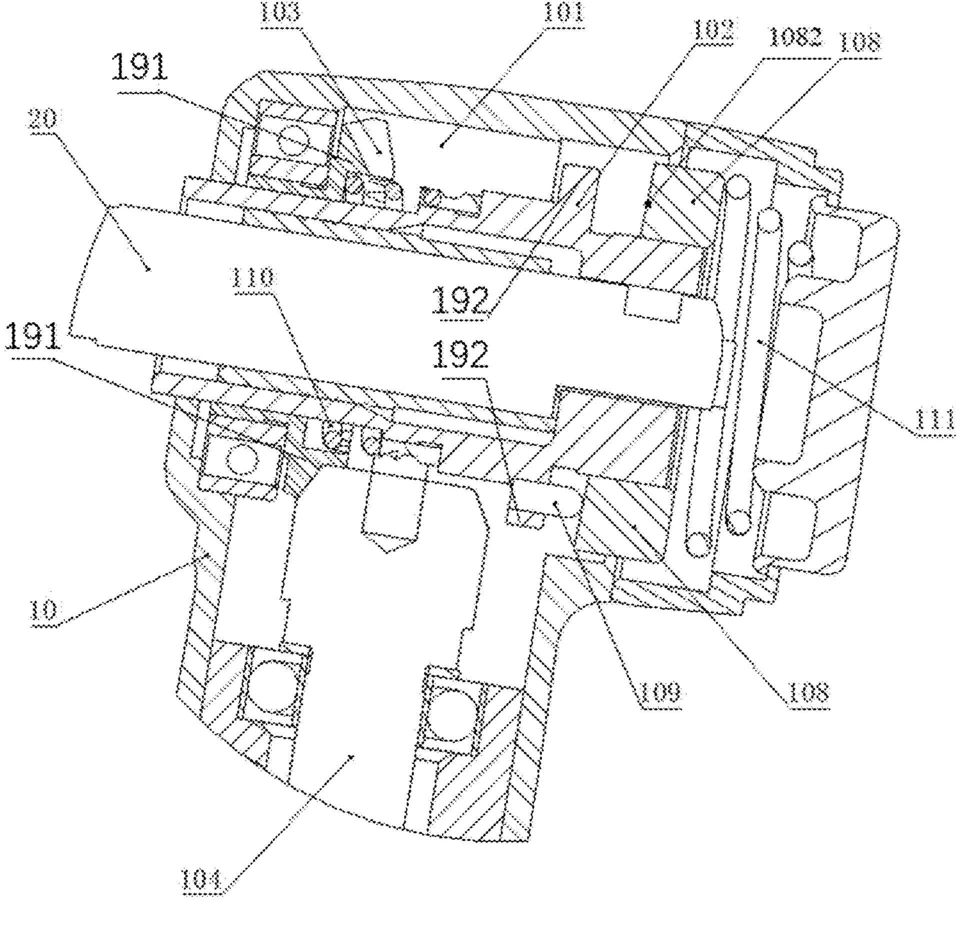
FIG. 2 is an enlarged view of FIG. 1 at A part.

Referring to FIGS. 1 and 2, the dental handpiece is typically of an elbow structure, comprising a head, a first-rod section 105, and a second-rod section 106 connected in sequence, wherein the angle between the length direction of the first-rod section 105 and the length direction of the second-rod section 106 is an obtuse angle, so as to allow for root canal enlargement treatment. The head is provided at an end of the first-rod section 105 away from the second-rod section 106, and an end of the second-rod section 106 away from the first-rod section 105 is connected to the operating handle. The first-rod section 105 comprises a distal end on which the head is arranged; and a proximal end. The second-rod section 106 comprises a distal end connected to the proximal end of the first-rod section 105; and a proximal end, wherein the operating handle is attached to the proximal end of the second-rod section 106.

The first-rod section 105 is provided therein with a transmission shaft 104, wherein the transmission shaft 104 is rotatable along its own axis in the first-rod section 105; and the second-rod section 106 is provided therein with a connecting shaft 107 rotatable along its own axis. The connecting shaft 107 comprises a distal end and a proximal end. The transmission shaft 104 comprises a distal end and a proximal end. The first end (proximal end) of the connecting shaft 107 is in transmission connection to the motor in the operating handle, and the second end (distal end) of the connecting shaft 107 is transmission connection to the first end (proximal end) of the transmission shaft 104.

The head of the dental handpiece of the embodiment comprises a head housing 10, wherein a machine core cavity 101 is provided in the head housing 10; and a rotatable machine core 102 and a driving gear 103 are provided in the machine core cavity 101. The machine core cavity 101 comprises a distal end and a proximal end. The machine core 102 comprises a distal end and a proximal end. The driving gear 103 is sleeved over one end of the machine core 102 (the distal end of the machine core 102), and the machine core 102 can move along the axial direction of the driving gear 103; and a reciprocating driving mechanism is further provided in the machine core cavity 101, and the reciprocating driving mechanism is configured for driving the machine core 102 to perform reciprocating movement along the axial direction of the machine core 102.

The machine core 102 is provided in the machine core cavity 101 of the head housing 10 and a driving gear 103 is provided at one end (the distal end) of the machine core 102, wherein the driving gear 103 is configured to be connected (engaged) to the transmission shaft 104 in a transmission way, such as an engaged transmission, so as to transmit the rotating driving torque of the motor to the driving gear 103 through the transmission shaft 104, so that the machine core 102 is driven to rotate. The machine core 102 is configured to be capable of moving along the axial direction of the driving gear 103. Moreover, a reciprocating driving mechanism is further provided in the machine core cavity 101, and the reciprocating driving mechanism is configured to drive the machine core 102 to perform reciprocating movement along its own axial direction, so that the machine core 102 performs reciprocating movement in the axial direction while being rotated. When the machine core 102 clamps the root canal file 20, the machine core 102 is able to drive the root canal file 20 to rotate and perform reciprocating movement along its own axial direction. Thus, when the dental handpiece of the present disclosure is used for root canal treatment, a root canal file 20 is driven to perform reciprocating movement along its own axial direction by the reciprocating driving mechanism, such that manual lifting is no longer required, thereby improving the treatment efficiency of root canal enlargement, reducing the requirement on the oral space of the patient, facilitating the operation of the treatment of root canal enlargement, and improving the patient's experience of treatment.

In the embodiment, the machine core 102 is rotatably provided in the machine core cavity 101, and a cavity for clamping the head of the root canal file 20 is provided inside the machine core 102, wherein one end (the distal end) of the machine core 102 extends out of the machine core cavity 101, so as to insert the head of the root canal file 20 into the machine core 102.

Combined with FIG. 2, as for the connection between the driving gear 103 and the machine core 102, the following methods can be adopted: a spline is provided in the middle of the driving gear 103 coaxially and a spline groove is provided in the outer wall of the machine core 102; a flat hole is provided in the middle of the driving wheel coaxially and a flat filament is provided at the outer wall of the machine core 102; or a through hole is provided in the middle of the driving gear 103 and a limit projection is provided in the side wall of the through hole, and a slide groove adapted to the limit projection is provided in the outer wall of the machine core 102, as long as the machine core 102 is able to rotate synchronously with the driving gear 103 and meanwhile the machine core 102 is able to slide along the length direction of the machine core 102 with respect to the driving gear 103. The driving gear 103 is usually a bevel gear, but it can also be a gear with teeth arranged vertically along the circumference.

For the reciprocating driving mechanism in the machine core cavity 101, it is only necessary to be able to drive the machine core 102 to perform reciprocating movement along the length direction of the machine core 102 without affecting the rotation of the machine core 102, such as the use of a contactless-driving electromagnet mechanism, a voice coil motor mechanism, or a cam mechanism. Specifically, in conjunction with FIG. 2, the reciprocating driving mechanism of the embodiment is a cam mechanism, wherein the cam mechanism comprises a driving block 108, a driving protrusion 109, and an elastic member 110.

The driving block 108 is located at an end of the machine core cavity 101 away from the driving gear 103, and an end surface of the driving block 108 near the driving gear 103 is provided with an annular driving surface which is coaxial to the machine core 102. In other words, the driving block 108 is located at the proximal end of the machine core cavity 101, and the driving block 108 comprises a distal end and a proximal end, wherein the distal end of the driving block 108 faces the driving gear 103, and the end surface of the distal end of the driving block 108 has an annular driving surface coaxial to the machine core 102. The driving block 108 can be either annular components that surround the end portion of the machine core 102, such as a bearing, or components formed by arranging the annular flange on the plate-shaped components. The distance from the driving surface to the driving gear 103 undulates along the circumferential direction of the driving surface, that is to say, the distance from the driving surface to the driving gear 103 becomes larger and smaller alternately along the circumferential direction of the driving block 108. The driving surface can be directly an inclined bevel. Alternatively, the driving surface can just be the end surface of the driving block 108 near the driving gear 103, or can be a part of the end surface of the driving block 108 near the driving gear 103. In an embodiment, the thickness of the driving block 108 is varied. For example, the end surface of the proximal end of the driving block 108 is perpendicular to the axis of the machine core 102, and the driving surface of the distal end of the driving block 108 undulates in the circumferential direction of the driving surface, that is to say, the thickness of the driving block 108 varies in a circumferential direction.

The driving protrusion 109 is provided on the machine core 102 and protrudes toward the driving block 108. The driving protrusion 109 can be integrally molded with the machine core 102 or separately provided relatively to the machine core 102, that is to say, the driving protrusion 109 is fixed and mounted on the machine core 102 detachably. For ease of processing, in the embodiment, the driving protrusion 109 is a pin inserted at the end portion of the machine core 102. A length direction of the pin can be at a certain angle to the length direction of the machine core 102, or is parallel or perpendicular to the length direction of the machine core 102.

The elastic member 110 can be a coil spring or a tubular elastic element such as bellows. The elastic member 110 is sleeved over the machine core 102, which is located and held between the driving gear 103 and the machine core 102. At the end of the driving gear 103 directly opposite to the elastic member 110, a first limiting portion 191 is provided to limit the movement of the elastic member 110 toward the driving gear 103; and the first limiting portion 191 can be a step surface provided at the end portion of the driving gear 103, or can be a stepped hole formed by recessing inwardly the end surface of the driving gear 103.

At the same time, the outer side wall of the machine core 102 is also provided with a second limiting portion 192 to limit the movement of the elastic member 110 toward the driving block 108, wherein the second limiting portion 192 can be a protrusion arranged on the outside of the machine core 102, or a convex shoulder arranged around the machine core 102; or the machine core 102 is made into a stepped shaft shape, then the limiting portion is a step surface of the machine core 102. Thus, the elastic member 110 can make the end portion of the driving protrusion 109 on the outer wall of the machine core 102 abut against the driving surface.

In addition, a preload spring 111 is provided in the end of the machine core cavity 101 away from the driving gear 103 (i.e., the proximal end of the machine core cavity 101). One end of the preload spring 111 abuts against the side wall of the machine core cavity 101 directly facing the driving block 108 and the other end of the preload spring 111 abuts against the driving block 108, so as to press the reciprocating driving mechanism against the driving gear 103. Therefore, the driving block 108 is pressed against the driving protrusion 109 tightly.

In summary, when the endo motor of the embodiment is in use, the dental handpiece is connected to the operating handle so that the connecting shaft 107 in the dental handpiece is connected to the motor in the operating handle in a transmission way; and the end portion of the root canal file 20 is inserted into the machine core 102, and the root canal file 20 is clamped by the machine core 102. Turning on the start button on the operation handle makes the motor work, so that the rotating torque of the motor is transmitted to the machine core 102 via the connecting shaft 107, the transmission shaft 104, and the driving gear 103 in sequence, which makes the machine core 102 rotate around the axis of the driving gear 103; and the machine core 102 drives the root canal file 20 to rotate.

During the rotation of the machine core 102, the elastic member 110 presses the driving protrusion 109 at the end portion of the machine core 102 against the driving surface of the driving block 108. As the driving surface undulates along the circumferential direction of the driving surface, the driving protrusion 109 also undulates along the circumferential direction of the driving surface by being pressed by the elastic member 110, thereby driving the machine core 102 to perform reciprocating movement in an axial direction of the driving gear 103 by the elastic member 110 and the driving block 108.

Thus, when the endo motor of the embodiment is used for root canal enlargement, the root canal file 20 performs reciprocating movement along the length direction of the root canal file 20 while in rotational motion, so that manual lifting for the handpiece is no longer required, thereby improving the treatment efficiency of root canal enlargement, reducing the requirement on the oral space of the patient, facilitating the operation of the treatment of root canal enlargement, and improving the patient's experience of treatment.

Figure 3:
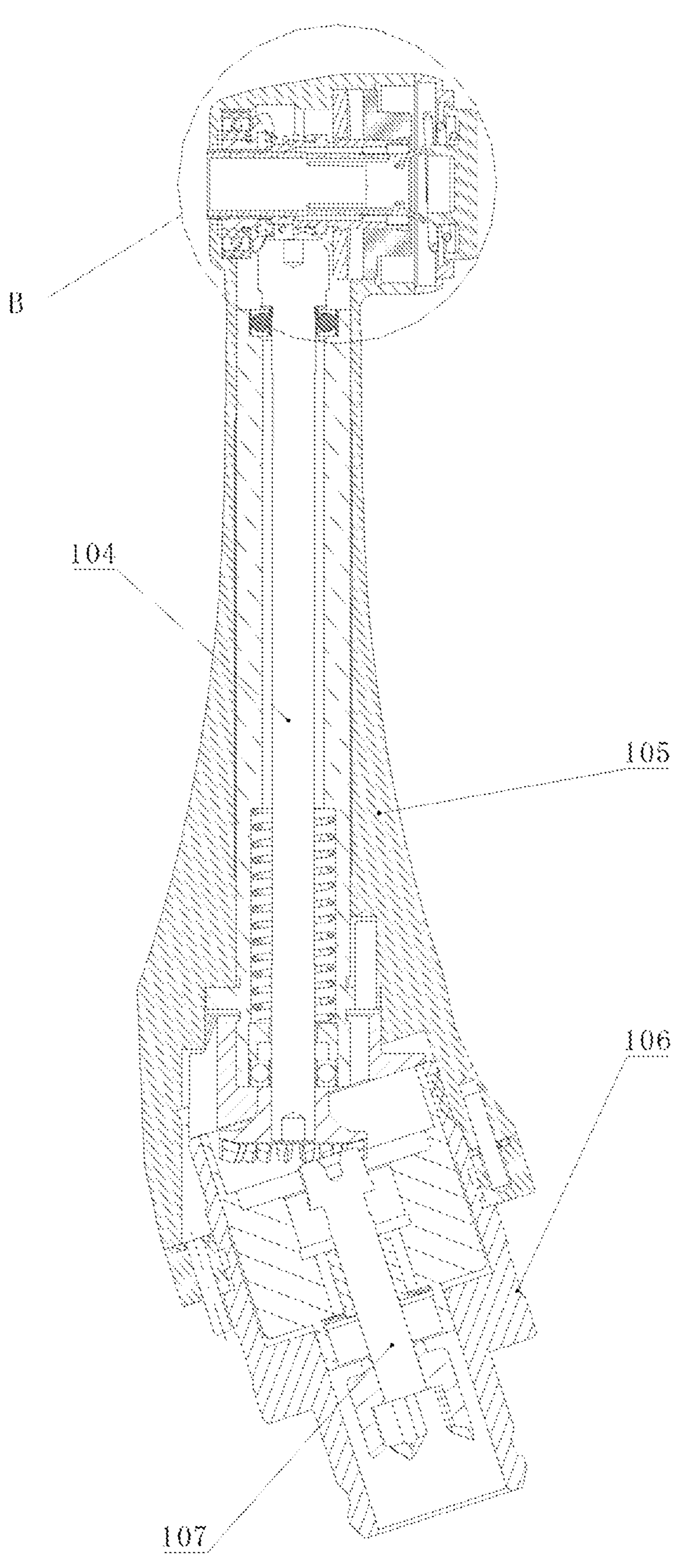
FIG. 3 is a schematic view of the structure of a dental handpiece of an embodiment of the present disclosure.

Referring to FIG. 3, the embodiment provides an endo motor, which has essentially the same basic structure, working principle, and technical effect achieved as the endo motor of the embodiment with reference to FIGS. 1 and 2. For the purpose of a brief description, parts of the embodiment not mentioned herein may be referred to the corresponding contents of the embodiments of FIGS. 1 and 2. Compared to the embodiments with reference to FIGS. 1 and 2, the present embodiment differs in that the structure of the reciprocating driving mechanism is different.

In the present embodiment, the reciprocating driving mechanism is a cam mechanism, wherein the cam mechanism comprises driving blocks 108 and a driving protrusion 109.

Figure 4:
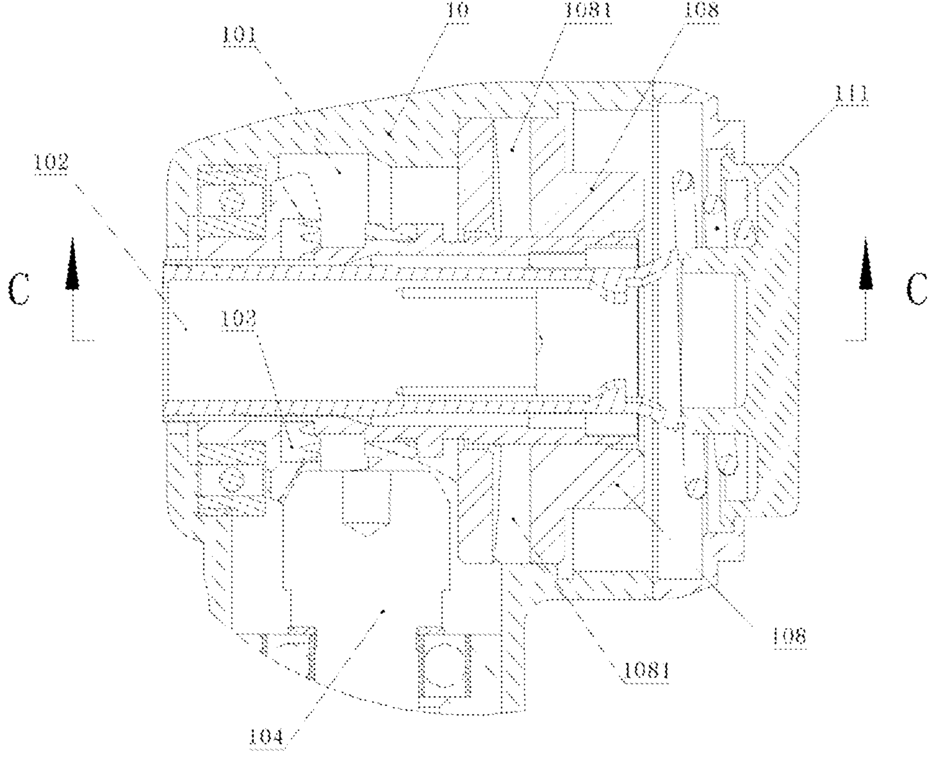
FIG. 4 is an enlarged view of FIG. 3 at B part.
Figure 5:
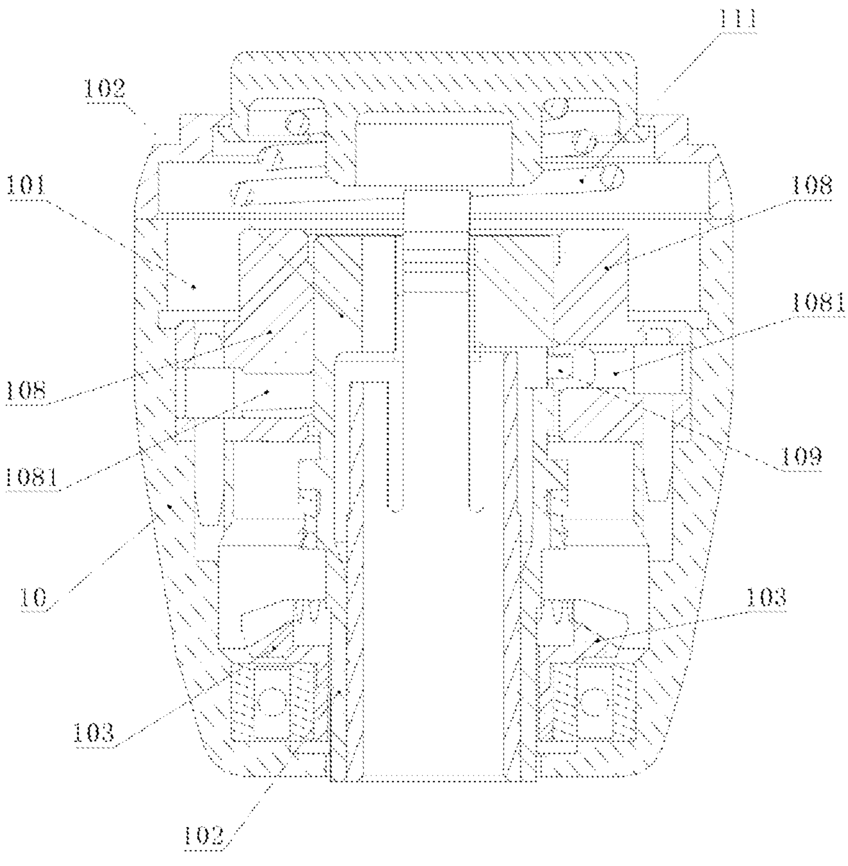
FIG. 5 is a sectional schematic view in C-C direction of FIG. 4.

Specifically, in conjunction with FIGS. 4 and 5, two driving blocks 108 are arranged opposite to each other, both of which are sleeved over the machine core 102; and an annular driving groove 1081 is formed between the two driving blocks 108. Along the circumferential direction of the driving block 108, that is, along the length direction of the driving groove 1081, two side walls of the driving groove 1081 directly facing the driving gear 103 undulate along the circumferential direction of the driving block 108, that is, the distance between the driving groove 1081 and the driving gear 103 varies gradually.

In the embodiment, the driving protrusion 109 is provided on the machine core 102, at least partially extends into the driving groove 1081 and is capable of moving relatively to the driving groove 1081. One end (first end) of the driving protrusion 109 is inserted into the side wall of the machine core 102 and the other end (second end) of the driving protrusion 109 is inserted into the driving groove 1081. The end (second end) of the driving protrusion 109 located in the driving groove 1081 is sleeved by a roller, and the roller is located in the driving groove 1081; and the end (second end) of the driving protrusion 109 located in the driving groove 1081 can be spherical or cylindrical. The two opposite side surfaces of the driving groove 1081 in the width direction are matched in shape and both are inclined surfaces, that is, the opposite end surfaces of the two driving blocks 108 are both inclined surfaces and matched in shape.

When the endo motor of the embodiment is in use, the motor in the operation handle transmits the rotational torque to the machine core 102 via the connecting shaft 107, the transmission shaft 104, and the driving gear 103 in sequence, which makes the machine core 102 rotate around the axis of the driving gear 103; and the machine core 102 drives the root canal file 20 to rotate. During the rotation of the machine core 102, the machine core 102 drives the driving protrusion 109 to rotate relatively to the driving block 108. Since both side walls of driving groove 1081 undulate along the circumferential direction of driving block 108 and one end of driving protrusion 109 is located within driving groove 1081, the side walls of driving groove 1081 force driving protrusion 109 to undulate along the length direction (axial direction) of machine core 102 when the driving protrusion 109 rotates relatively to driving block 108, such that the machine core 102 is driven to perform reciprocating movement along the axial direction of the driving gear 103 by the driving groove 1081 and the driving protrusion 109.

The driving protrusion 109 is provided with a structure of roller, which can, by the rolling of the roller, reduce the frictional force that the driving protrusion 109 moves with respect to the driving block, when the machine core 102 rotates relatively to the driving block 108. The embodiment is simpler in structure and more reliable than the embodiment in FIGS. 1 and 2, which does not require the use of elastic member 110.

Figure 6:
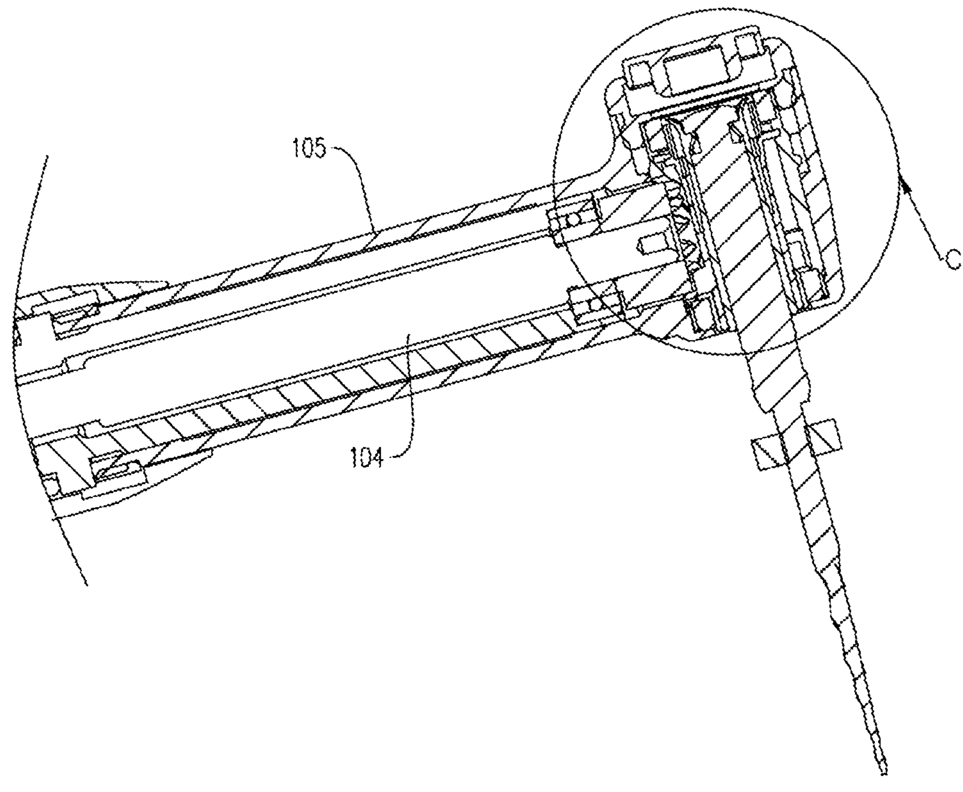
FIG. 6 is a schematic view of the structure of a dental handpiece of an embodiment of the present disclosure.

Referring to FIG. 6, the embodiment provides an endo motor, which has essentially the same basic structure, working principle, and technical effect achieved as the endo motor of the embodiment with reference to FIGS. 3 to 5. For the purpose of a brief description, parts of the embodiment not mentioned herein may be referred to the corresponding contents of the embodiments of FIGS. 3 to 5. Compared to the embodiments with reference to FIGS. 3 to 5, the present embodiment differs in that the structure of the reciprocating driving mechanism is different.

In the embodiment, the reciprocating driving mechanism is a cam mechanism, wherein the cam mechanism comprises a machine core sleeve 112 and a driving protrusion 109; and the driving groove 1081 is formed in the inner wall of the machine core sleeve 112.

Figure 7:
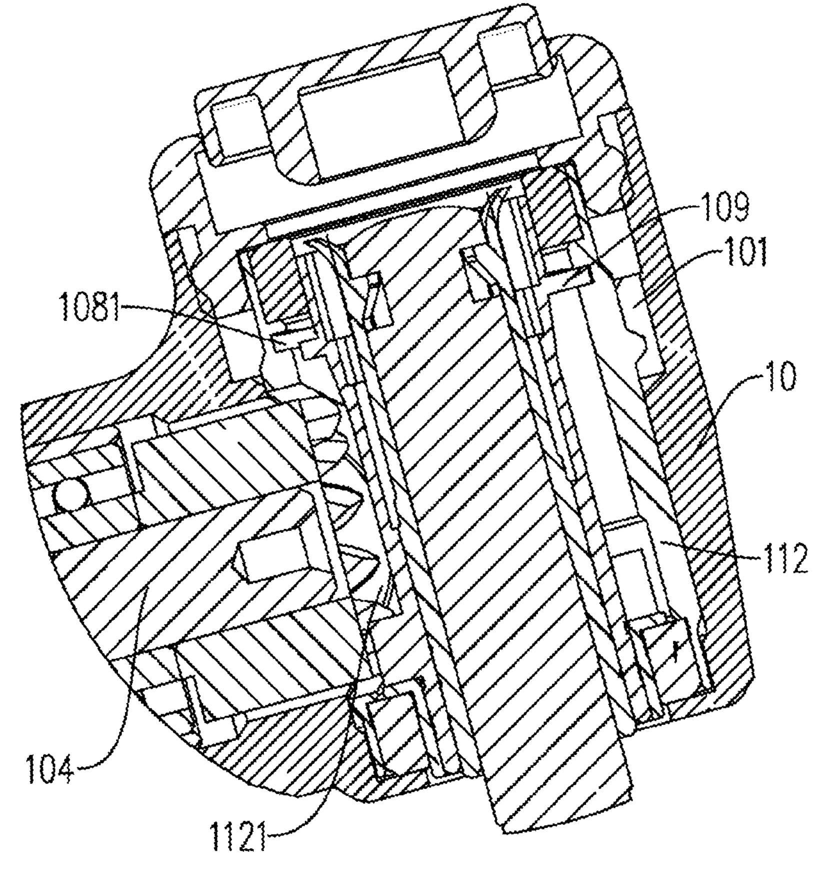
FIG. 7 is an enlarged view of FIG. 6 at C part.
Figure 8:
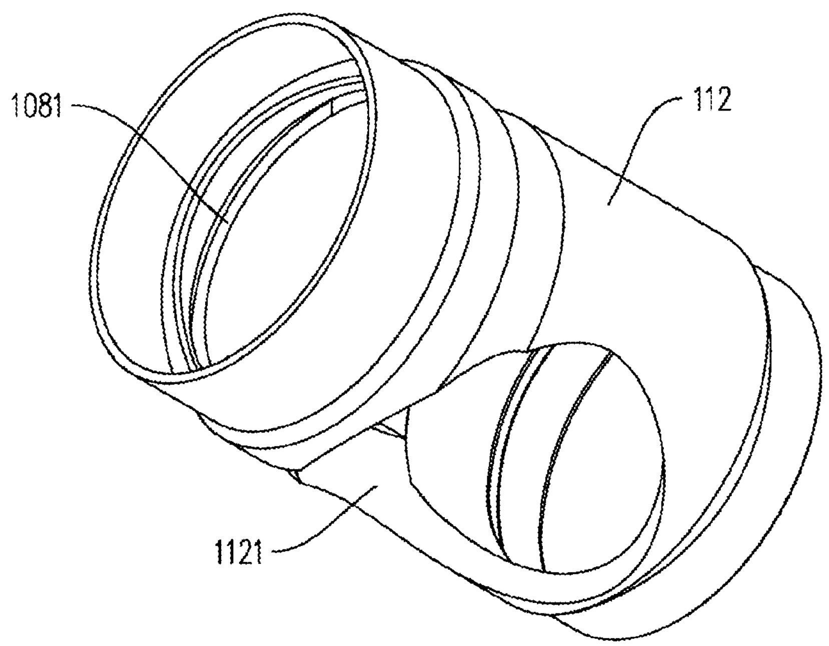
FIG. 8 is a schematic view of a machine core sleeve of an embodiment of the present disclosure in a first angle of view.
Figure 9:
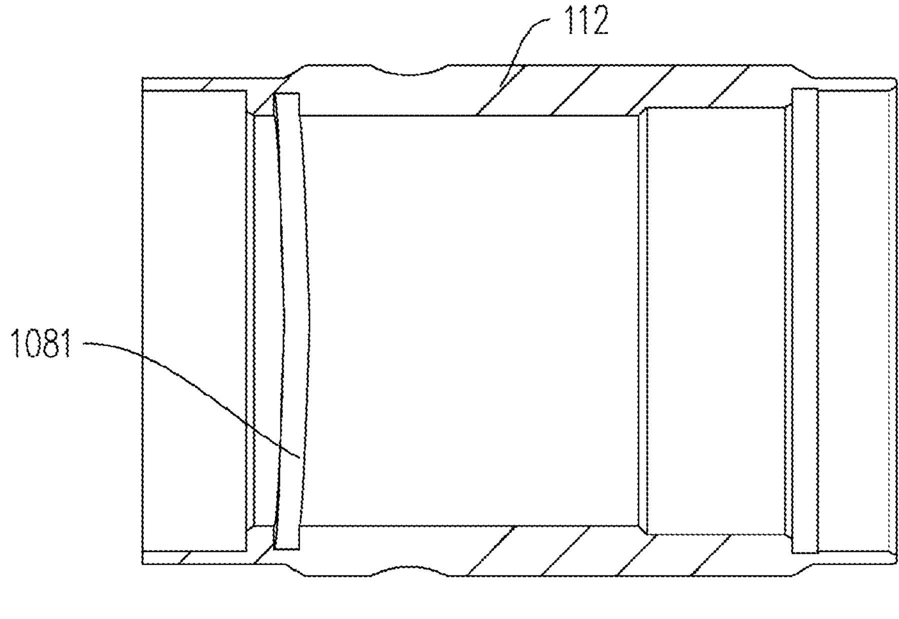
FIG. 9 is a schematic view of a machine core sleeve of an embodiment of the present disclosure in a second angle of view.

In combination with FIGS. 7 to 9, the machine core sleeve 112 is tubular in shape and sleeved over the machine core 102 and the gear of the machine core 102, wherein the side wall of the machine core sleeve 112 is provided with a through hole 1121 in a penetrating manner. The through hole 1121 is configured for the transmission shaft 104 to pass through, such that the transmission shaft 104 is configured to be connected to the driving gear 103 in a transmission way, so as to make the driving gear 103 drive the machine core 102 to rotate. The inner wall of the machine core sleeve 112 is provided with a driving groove 1081 that is circumferentially surrounded; and the distance between the driving groove 1081 and the driving gear 103 varies gradually along the circumferential direction of the machine core sleeve 112, that is, along the length direction of the driving groove 1081.

In the embodiment, the driving protrusion 109 is provided on the machine core 102, at least partially extends into the driving groove 1081 and is capable of moving relatively to the driving groove 1081. One end (first end) of the driving protrusion 109 is inserted into the side wall of the machine core 102 and the other end (second end) of the driving protrusion 109 is inserted into the driving groove 1081. The end (second end) of the driving protrusion 109 located in the driving groove 1081 is sleeved by a roller, and the roller is located in the driving groove 1081; and the end of the driving protrusion 109 located in the driving groove 1081 can be spherical or cylindrical. The two opposite side surfaces of driving groove 1081, corresponding to the driving protrusion 109, are matched in shape and both are inclined surfaces.

When the endo motor of the embodiment is in use, the motor in the operation handle transmits the rotational torque to the machine core 102 via the connecting shaft 107, the transmission shaft 104, and the driving gear 103 in sequence, which makes the machine core 102 rotate around the axis of the driving gear 103; and the machine core 102 drives the root canal file 20 to rotate. During the rotation of the machine core 102, the machine core 102 drives the driving protrusion 109 to rotate relatively to the driving block 108. Since both side walls of driving groove 1081 undulate along the circumferential direction of driving block 108 and one end of driving protrusion 109 is located within driving groove 1081, the side walls of driving groove 1081 force driving protrusion 109 to undulate along the length direction of machine core 102 when the driving protrusion 109 rotates relatively to driving block 108. Therefore, the machine core 102 is driven to perform reciprocating movement along the axial direction of the driving gear 103 by the driving groove 1081 and the driving protrusion 109.

The driving protrusion 109 is provided with a structure of roller, which can, by the rolling of the roller, reduce the frictional force that the driving protrusion 109 moves with respect to the driving block, when the machine core 102 rotates relatively to the driving block 108. The embodiment is simpler in structure and more reliable than the embodiment in FIGS. 1 and 2, which does not require the use of elastic member 110.

The above is only an optional embodiment of the present disclosure, which is not intended to limit the present disclosure, and the present disclosure may have various changes and variations for those skilled in the art. Any modification, equivalent substitution, improvement, etc. made within the spirit and principles of the present disclosure shall be included in the scope of protection of the present disclosure.

INDUSTRIAL PRACTICALITY

The present disclosure provides a dental handpiece and a head thereof, and an endo motor, which is capable of driving the machine core to rotate and driving the machine core to perform reciprocating movement along the axial direction of the machine core. Therefore, there is no need to repeatedly lift the contra-angle handpiece during the treatment of enlarging the root canal, resulting in facilitating the operation of the root canal enlargement and improving efficiency of the operation of the root canal enlargement, which reduces the requirement on the oral space of the patient and facilitates the operation of enlargement treatment for root canal, thereby improving the patient's experience of treatment.

What is claimed is:

1. A head of a dental handpiece, wherein the head comprises a head housing, wherein a machine core cavity is provided in the head housing; and a rotatable machine core and a driving gear are provided in the machine core cavity;

the driving gear is sleeved over one end of the machine core, and the machine core is capable of moving along an axial direction of the driving gear; and a reciprocating driving mechanism is further provided in the machine core cavity, and the reciprocating driving mechanism is configured to drive the machine core to perform reciprocating movement along an axial direction of the machine core wherein the reciprocating driving mechanism is a cam mechanism, comprising a driving block, a driving protrusion, and an elastic member, wherein the driving block is located at an end of the machine core cavity away from the driving gear, and an end surface of the driving block close to the driving gear is provided with an annular driving surface which is coaxial to the machine core, wherein a distance between the driving surface and the driving gear varies gradually along a circumferential direction of the driving block;

the driving protrusion is provided on the machine core and protrudes towards the driving surface; and the elastic member is configured to keep the driving protrusion abutting against the driving surface, wherein the elastic member is sleeved over the machine core and held between the driving gear and the machine core.

2. The head of the dental handpiece according to claim 1, wherein the driving surface is an inclined surface.

3. The head of the dental handpiece according to claim 1, wherein a first limiting portion is provided at an end of the driving gear directly opposite the elastic member, and configured to limit the elastic member from moving toward the driving gear.

4. The head of the dental handpiece according to claim 3, wherein a second limiting portion is provided on an outer side wall of the machine core, and configured to limit the elastic member from moving toward the driving block.

5. The head of the dental handpiece according to claim 4, wherein the second limiting portion is a protrusion provided on an outside of the machine core, a convex shoulder provided as surrounding the machine core, or a stepped shaft structure made of the machine core.

6. The head of the dental handpiece according to claim 3, wherein the first limiting portion is a step surface provided at an end portion of the driving gear or a stepped hole formed by recessing inwardly an end surface of the driving gear.

7. The head of the dental handpiece according to claim 1, wherein a cavity for clamping a head of a root canal file is provided inside the machine core, and one end of the machine core extends out of the machine core cavity to insert the head of the root canal file into the machine core.

8. The head of the dental handpiece according to claim 1, wherein a preload spring is provided in an end of the machine core cavity away from the driving gear, and the preload spring is configured to press the reciprocating driving mechanism against the driving gear.

9. The head of the dental handpiece according to claim 1, wherein the driving block is selected from an annular component that surrounds an end portion of the machine core or a component formed by arranging an annular flange on a plate-shaped component.

10. The head of the dental handpiece according to claim 9, wherein the driving block is an annular component that surrounds an end portion of the machine core, wherein the annular component that surrounds the end portion of the machine core is a bearing.

11. A dental handpiece, comprising the head of the dental handpiece according to claim 1.

12. An endo motor, comprising the dental handpiece according to claim 11.

* * * * *